(12) United States Patent  
Alsina

(10) Patent No.: US 6,642,691 B2  
(45) Date of Patent: Nov. 4, 2003

(54) AUTONOMOUS INTERACTIVE SOLAR ENERGY PRODUCTION SYSTEM

(76) Inventor: Francesc Sureda Alsina, Mas Roig E-17240 (Girona), Llagostera (ES)

( * ) Notice: Subject to any disclaimer, the term of this patent is extended or adjusted under 35 U.S.C. 154(b) by 0 days.

(21) Appl. No.: 10/169,171

(22) PCT Filed: Dec. 27, 2000

(86) PCT No.: PCT/ES00/00489

§ 371 (c)(1),
(2), (4) Date: Jun. 27, 2002

(87) PCT Pub. No.: WO01/48426

PCT Pub. Date: Jul. 5, 2001

(65) Prior Publication Data

US 2002/0190688 A1 Dec. 19, 2002

(30) Foreign Application Priority Data

Dec. 28, 1999 (ES) .............................. 20000039

(51) Int. Cl.⁷ ................................................ H02J 7/00
(52) U.S. Cl. ...................................... 320/101; 320/107
(58) Field of Search ................................ 320/101, 107; 136/243, 244, 246, 251, 261; 307/64, 65, 149

(56) References Cited

U.S. PATENT DOCUMENTS

| 4,782,816 | A | * | 11/1988 | Salgado et al. | ............. 126/590 |
| 5,798,517 | A | * | 8/1998 | Berger | ..................... 250/203.4 |
| 5,863,228 | A | * | 1/1999 | Tether | ............................ 440/6 |
| 6,042,060 | A | * | 3/2000 | Sargis | ......................... 246/221 |
| 6,396,239 | B1 | * | 5/2002 | Benn et al. | ................. 320/101 |

* cited by examiner

*Primary Examiner*—Lawrence Luk
(74) *Attorney, Agent, or Firm*—Steinberg & Raskin, P.C.

(57) ABSTRACT

An autonomous interactive solar energy production system including a base secured to a floor, a parallelepiped body that swivels on the base including a tilting face fitted with a filed of photovoltaic, thermal and/or mixed cells, a solar energy collector, whose uptake field makes two movements for tracking the sun, one along the azimuth between 0 and 280° between sunrise and sunset, and the other along the zenith between 90 and 45°.

4 Claims, 2 Drawing Sheets

AUTONOMOUS INTERACTIVE SOLAR ENERGY PRODUCTION SYSTEM

FIELD OF THE INVENTION

The present invention relates to a free-standing interactive system for the production of solar energy.

BACKGROUND OF THE INVENTION

To date various systems are known for the production solar energy. These are comprised of a solar panel, consisting of a photovoltaic, thermal or mixed rotating field positioned preferentially towards the south, or which rotates relationship to the sun in order to collect the maximum amount of energy solar during the azimuthal and zenithal travel of the sun during the day from when it rises until it sets in the west.

There are several patents relating to the production of solar energy, such as CA 2139251 to McPhee, CN 1049556 to Xinkai General Pilot Plant Chic, DE 4305312 to Baehr, U.S. Pat. No. 5,191,875 to Edling et al., JP 10-205892 to Arumo K K and DE 19536087 to Seifer, but all of these patents present the same type of inconveniences.

These known systems present several inconveniences which can be considered to include the azimuthal and zenithal alignment of the photovoltaic, thermal and/or mixed fields which collect the solar energy not achieving a perfect energy balance as in order to follow the sun mechanically they consume energy. This means that the tracking movements are not necessarily independent of their usefulness for collecting the maximum amount of energy, for example whenever it is cloudy, raining or when the inclemency of the weather do not allow advantage to be taken of solar radiation. In these cases, the performance with tracking is below 0 because the tracking does not increase the performance and on the other hand, it consumes energy during the computer tracking of the orbit of the sun and, naturally more so during the subsequent mechanical tracking.

Other inconveniences are the fact that even though the photovoltaic and/or thermal fields rotate to follow the sun's azimuth from east to west and its vertical zenith to collect the maximum amount of solar energy, if this energy is not consumed immediately, it possibly may not be stored because of temporary lack of capacity of the accumulator batteries due to limitation of the load that cuts off self-charging. Furthermore, these systems do not maintain or guarantee the electrical power supply under unfavourable climatic conditions, when it is cloudy, raining, etc., and so require the inclusion of an independent energy generator.

OBJECTS AND SUMMARY OF THE INVENTION

The above mentioned have been completely eliminated with the free-standing interactive system for the production of solar energy object of this invention, that is characterised because it includes a combination of a series of components assembled in a unique way and including at least one of the following elements: a photovoltaic, thermal and/or mixed field of silicon constituting an energy uptake device, a azimuthal and zenithal tracking device to orient the photovoltaic, thermal and/or mixed field of silicon receptors perpendicularly to the sun during the day so that the sun's rays correspond to the angle of maximum performance to provide maximum energy uptake, an energy accumulator system to store the energy and make it available during the night and/or under adverse climatic conditions to enable maximum profit to be made from the stored energy, an emergency back-up generator that acts as a power supply to produce energy during peak consumption periods and which acts as a safety system, a parallel connection to the public power supply network to receive/transfer energy, and information processing systems that provide the information on the variations in the consumption of the different components of the installation and the energy production, and which automatically and interactively determines where the energy should be obtained and to which appliance it should be supplied.

This invention includes a charge control device that controls the storage of the energy obtained from the photovoltaic, thermal and/or mixed fields that act sequentially and diachronically with independence of the storage device, a rectifier-charger that converts the direct current into alternating current and/or acts as a charger for the accumulator batteries, and collectors of excess residual electrical energy that distribute the electrical energy generated by the power generator.

Furthermore, the invention includes the implementation of the above system for the production of solar energy by means of a fixed base and a prism that swivels on the base, said prism turning on the azimuth from 0° to 280° from east to west corresponding to the path of the sun and presenting a tilted face that constitutes the photovoltaic, thermal and/or mixed field of silicon collectors that absorb the solar energy and which tilts between 45° and 90° to align itself perpendicularly, with a margin of a few degrees, to the rays of the sun during its zenithal movement in order to achieve maximum performance in the generation of energy. Aligning the photovoltaic, thermal and/or mixed fields to the azimuth and zenith to maintain them perpendicular to the rays of the sun during its travel from when it rises until it sets.

According to the invention, the safety and support generator is mounted on the floor independently of the base and the prism to prevent the transmission of any vibrations, and it is centred on the base whose sides incorporate the other devices as mentioned. The prism incorporates the duly sealed information processing system and other mentioned components.

According to the system of the invention, the photovoltaic and/or thermal fields act independently and diachronically in a random way, enabling the production of energy to be adapted to the capacity of the accumulator batteries at each moment.

BRIEF DESCRIPTION OF THE DRAWINGS

These and other characteristics can be better understood from the following detailed description. This description is also accompanied by two pages of drawings representing a practical application of the invention which is mentioned as an example only and is not limiting in any way of the scope of this invention.

In these drawings.

DETAILED DESCRIPTION OF THE INVENTION

Figure 1:
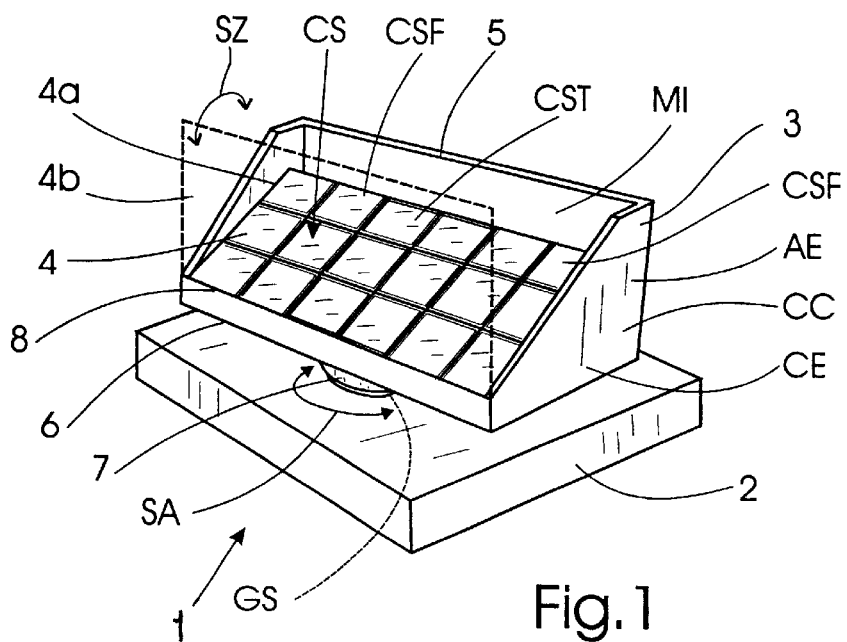
FIG. 1 is a perspective view of the system object of this invention, according to one way of applying the invention.

As can be seen in the drawings, the free-standing interactive system for the production of solar energy object of this invention includes a series of elements assembled in a unique way to obtain maximum performance from the system of the invention.

Figure 2:
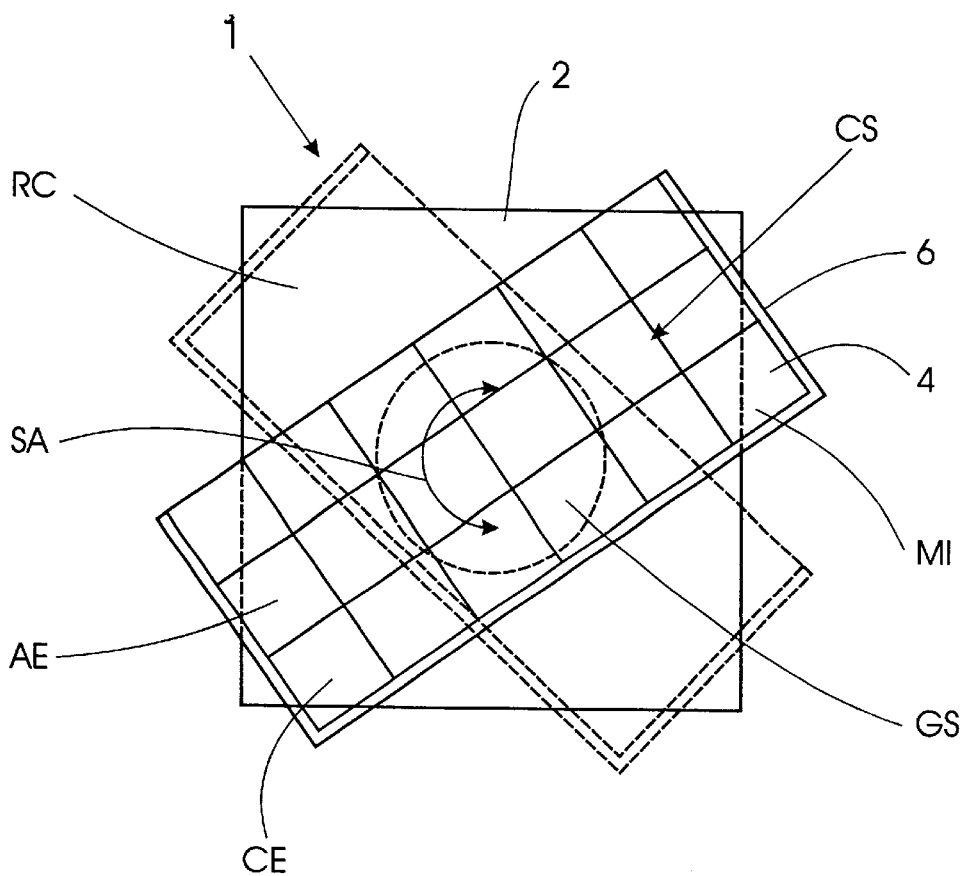
FIG. 2 is a schematic plan drawing of the system illustrated in FIG. 1.

The system of the invention illustrated in FIGS. 1 and 2 according to the preferred construction, and with general reference -1- includes a fixed base -2- on the ground and an element shaped like a prism -3- which swivels on the fixed base -2-. This prism consists of a body that presents a large main face -4- which tilts, a fixed rear face -5- and a lower face -6- which swivels and enables the body making up the prism to turn on the fixed base -2-.

The system -1- of the invention consisting of the fixed base -2-, the swivelling prism -3- and the tilting main face house the different elements that are combined and connected in a special way to enable the maximum use of the solar energy collected by the system although the preferred installation of some components of the system is in the swivelling prism -3-.

The system -1- of the invention includes as elements a field -CS-, which may be photovoltaic, thermal or mixed and which may be changed as required. This photovoltaic/mixed silicon field -CS- is mounted on the main wall -4- tilted to between 45 and 90° so that it can at all times align itself perpendicularly to the rays of the sun, following the whole arc of the zenith from sunrise until sunset and also follow an arc of the azimuth between 0 and 280° corresponding to the range between when the sun rises in the east until it sets in the west.

In summary, the system of this invention enables the field -CS- of photovoltaic/mixed silicon cells to align itself following the path of the sun and as perpendicular as possible to the sun's rays, although with a small margin of error, turning the field along the azimuth between approximately 0 and 280° corresponding to the interval between sunrise in the east and sunset in the west, and turning the field along the zenith between 45 and 90° corresponding to the interval between the position of sunrise and sunset on the horizon and the highest point reached by the sun at midday. All of which implies that at all times the rays of the sun fall as perpendicular as possible to the field of silicon -CS-, implying rotation on the azimuth (0–280°) and tilting along the zenith between 90° (the sun on the horizon, at sunrise and sunset) and 45° (the sun at the highest zenith point at midday), all this taking into consideration the variations due to the seasons of the year, and the hemisphere where the system of the invention is installed.

Another of the elements of the system corresponds to the azimuth -SA- and zenithal -SZ- tracking device which enables, as mentioned, adjusting the -CS- field during the day to the rays of the sun to ensure the angle of maximum performance, corresponding to the rays of the sun falling at right angles to the main wall -4- which supports the mentioned photovoltaic/thermal field -CS- for the above mentioned azimuth (0–280°) and zenith (45–90°) movements.

The system -1- includes an energy accumulator -AE- located in the prism -3- which efficiently stores the energy during the day and supplies it during the night or in the event of adverse climatic conditions, rain, cloud, storms, etc.

Another element of the system of the invention is an emergency backup generator -GS- which is located in the central part of the base -2- and corresponding to the axis of rotation of the prism -3- on the base -2- and which is anchored to the floor or ground independently of the base -2- and the prism -3- so as not to transmit any vibrations to them. Said generator -GS- acts as a power generator to produce energy during peaks of high consumption, and also acts as a safety system to protect the accumulator batteries.

The system -1- is fitted with a parallel connection with the public power supply network, which is conventional and therefore not illustrated and which enables energy to be received from the network or transferred to the network, according to the stipulations of current legislation.

Finally, as one of the main elements or components, the system -1- includes information processing systems -MY- which provide information at all times on the variations in the consumption of the various components of the installation, home, place of work, or similar where the system of the invention is installed. Furthermore, said information processing systems provide information on the energy produced by the system, and automatically interactively determine where the energy should be obtained and to which appliance it should be supplied.

According to the invention, the system -1- comprises a charge control -RC- which controls the storage in the system for storing the energy obtained from the photovoltaic, thermal or mixed field (or fields) which act sequentially and diachronically (in time) and in a random way. The system comprises a rectifier-charger -CC- which converts direct current into alternating current, or acts as a charger for the energy accumulator -AE-. Furthermore, the system -1- comprises excess residual electrical energy collectors -CE- which distribute the electrical energy generated by the power generator -GS- (emergency and backup generator).

As indicated and described, the fixed base -2- supports the swivelling prism -3- on a crown wheel -7- which enables the prism to turn on the base. The prism swivels along the azimuth from 0 to 280° from east to west corresponding to the path of the sun, as indicated, and presents one main face or wall -4- which tilts on the shaft/axis -8-, whose face or wall -4- moves between two extreme positions, one -4a- illustrated as a line in FIG. 1 at a slightly inclined position, and the other -4b- illustrated as a dotted line in FIG. 1 at a position of 90° to the floor or ground. This tilting movement of the wall -4-, enables it to align itself perpendicular to the rays of the sun between 45 and 90° for displacement along the zenith, as indicated with a margin of error in this alignment of a few degrees. The wall -4- constituting and sustaining the field of photovoltaic/thermal silicon cells -CS-, swivels along the azimuth and tilts on the zenith between the indicated positions, and enables ideal alignment of the field of silicon -CS- respect to the rays of the sun during the day, maximum performance in collecting energy corresponding to a perpendicular incidence of the rays on the wall -4-.

This performance of maximum energy uptake depends on the weather as in the event of storm with wind, rain, or both, the system -1- of the invention incorporates a safety system that automatically tilts the wall -P- comprising of the field -CS- of photovoltaic, thermal and/or mixed silicon cells to the position of 45° corresponding to closure of the prism, in that the system incorporates safety measures which, in the event that it cannot collect energy because of environmental and/or meteorological conditions, the system of the invention closes the prism to safeguard the integrity of the panel.

When the climatic conditions are adequate, the system of the invention plots the zenithal movement of the silicon field -CS- mounted on the inclined wall -4- of the prism -3-.

The system of the invention incorporates an emergency backup generator -GS- mounted on the floor or ground and independent of the base -2- and the prism -3-, in order to avoid the transmission of vibrations to the base and prism as indicated above. This safety generator -GS- is mounted as illustrated in FIGS. 1 and 2, centred on the base -2-, which incorporates on the sides the other elements mentioned above, and for its part, the rear wall -5- of the prism -3- incorporates the information processing components -MY- and the other mentioned components duly sealed as the system -1- is installed outdoors and exposed to the inclemency of the weather.

System -1- of the invention considers that the field of silicon -CS- may comprise part of a photovoltaic field -CSF- and part of a thermal field -CST-, which could act independently and diachronically in a random way, and enable the production of energy to adapt to the capacity of the accumulators at each given time. The wall -4- constituted by the field of photovoltaic, thermal or mixed silicon cells -CS- could be comprised of a portion of photovoltaic field -CSF-, and for example a central part corresponding to a portion of thermal field -CST-. In the same way, the system of the invention enables these photovoltaic or thermal fields to be varied as required, occupying the part that the user so assigns of the whole surface of the tilting wall -4-. Furthermore, the system of the invention enables, as required, part of the silicon field -CS- to be disconnected either the section of the photovoltaic field -CSF- or the section of the thermal field -CST-.

Figure 3:
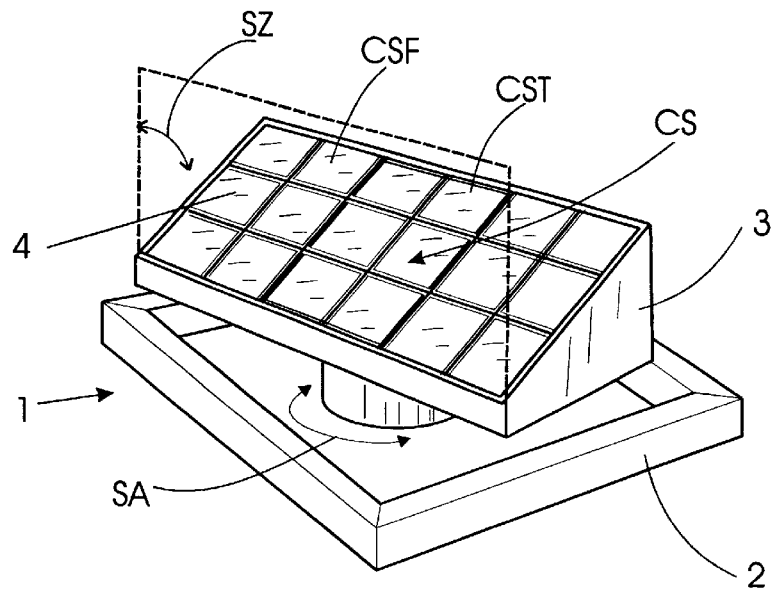
FIG. 3 is a perspective view of the system object of this invention, according to another way of applying the invention.
Figure 4:
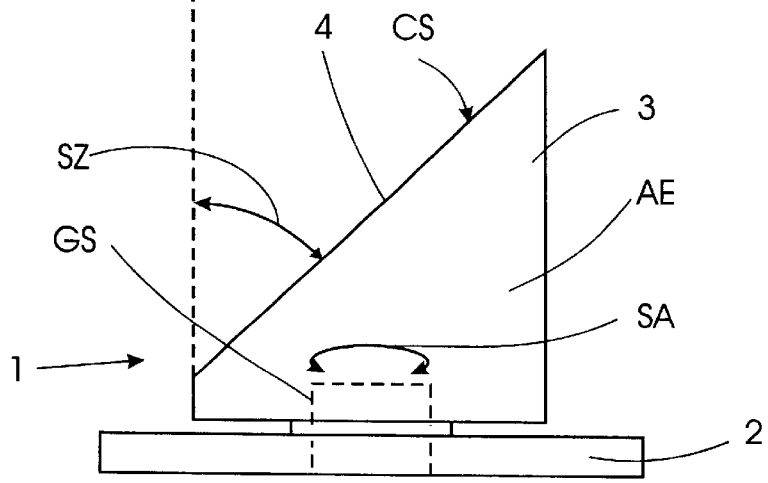
FIG. 4 is a elevation drawing of the system object of this invention, according to another way of applying the invention.

FIGS. 3 and 4 illustrate another configuration of the invention, exactly the same as that illustrated in FIGS. 1 and 2, but emphasising the fact that the base -2- does not consist of a flat parallelepiped body, as shown in FIGS. 1 and 2, but that it basically consists of a metal frame (see especially FIG. 3) comprising a series of metal beams or similar, joined together by welding or an equivalent system, which may be mounted on the floor or ground in any convenient way, for example, on a concrete foundation and preferably slightly raised over the surrounding ground for protection against possible flooding or similar, the same reason for raising and separating the prism -3- which contains the system components of the invention as much as possible above the ground for its protection. The emergency backup generator -GS- (power generator) is mounted directly on the ground on a concrete foundation or other corresponding support, located centrally and independent of the metal frame -2- and the prism -3-.

Figure 5:
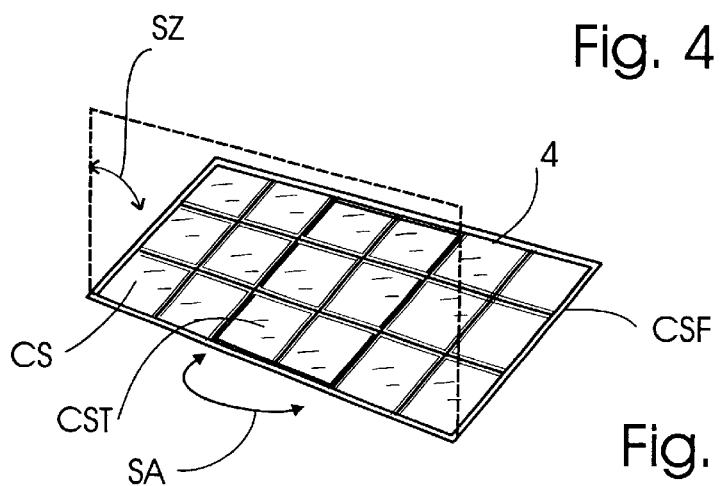
FIG. 5 is a schematic diagram illustrating the azimuthal and zenithal movement of the silicon field of photon collector cells as per this invention.

Furthermore, FIG. 5 represents the system of the invention in a very schematic way in reference to the wall -4- that comprises the photovoltaic/thermal or mixed silicon field -CS-, which illustrates, also in a very schematic way, the double azimuthal and zenithal movement of the unit with respect to the movements of the sun, and aligns itself at all times as perpendicular as possible to the sun much in the same way as the movements of the well known sun-flower plant.

The system of the invention, that has completed a daily rotation of 280° very slowly at predetermined intervals, performs a reverse movement of 280° during the night to place itself once again in the initial position of 0°, and in the same way, the silicon field -CS- of the wall -4- on completing the zenith movement in which it is in a position of 90° performs the return movement up to the 45° position corresponding to the closure of the prism (if it has not closed previously because of rain and/or wind as indicated), so that the system of the invention closes the prism and rotates the prism with reference to the base frame -2-, so that it is ready for a new cycle of energy collection the next day.

The system of the invention is a self-managed and progressive system so that when the system of the invention is fitted with a first photovoltaic panel of, for example, one square meter, it already collects energy so that the user may progressively and slowly construct or incorporate the other components that constitute the complete final system.

According to the system of the invention, the emergency and support generator -GS-, which is basically constituted by a power generator activated by a power supply preferably comprising a conventional battery (14 volts), enables supplying the home, housing estate, facility, factory, or other with the energy required during "peak" energy demands whereas the "normal" energy ("average" consumption) usually required by the home, facility, etc., is supplied by the energy accumulator batteries.

Furthermore, the system of the invention, presents intercommunication between all the "appliances" in the home, facility or other, as well as between the different components constituting the system such as the component that controls the azimuth/zenith tracking movement of the photovoltaic field and in a similar way the energy collector, the generator -GS- (power generator), computer, fax, electrical installation, washing machine, television, music system, alarm, simple "elementary" information processing mediums, etc., so that the system operates in a self controlled manner in response to the necessities at each time, in the event of demand for any type of energy, for example, to operate the washing machine, or any other appliance or component, or before an express demand by the system user.

What is claimed is:

1. A system for the production of solar energy comprising:
   an energy uptake device including a field of silicon cells for receiving solar energy, said energy uptake device being structured and arranged so that said silicon cells are tiltable to enable said cells to be always arranged perpendicularly to the sun's rays;
   an energy accumulator to store the energy received by said energy uptake device;
   an energy backup generator for providing energy during adverse climatic conditions and during peak consumption, said energy backup generator also functioning as a safety system;
   a parallel connection to a public power supply network for receiving and transferring energy to and from said network;
   an information processing system for monitoring an energy usage of a plurality of energy consuming appliances located in the environment in which said system is installed, said information processing system being structured and arranged to automatically and interactively monitor the energy being used by each of said plurality of appliances and determine to which of said plurality of appliances said energy should b supplied;
   a fixed base;
   a swivelling crown wheel group led to said base;
   a prism coupled to said crown wheel to enable said prism to swivel along the azimuth from 0° to 280° from east to west corresponding to the path of the sun, said prism including an articulated face to which said silicon cells are mounted, said articulated face being structured and arranged to tilt between 45° and 90° to thereby align itself perpendicularly to the rays of the sun; and wherein said energy backup generator is mounted on a floor independently of said fixed base and said prism to prevent any transmission of vibration from said prism.

2. The system according to claim 1, further comprising:

an charge control device for controlling the storage of the energy received from the field of silicon cells;

an alternator-charger that converts direct current into alternating current;

collectors of residual excess energy that distribute the electrical energy generated by the power generator.

3. The system according to claim 1, wherein said field of silicon cells include photovoltaic and thermal cells.

4. The system according to claim 3, wherein said photovoltaic and thermal cells act independently and diachronically in a random way to thereby enable the production of energy to be adapted to the capacity of the accumulators at each moment.

* * * * *